United States Patent Office 3,531,265
Patented Sept. 29, 1970

3,531,265
SYNTHESIS GAS PURIFICATION
Roger M. Dille, La Habra, Calif., assignor to Texaco Inc., New York, N.Y., a corporation of Delaware
No Drawing. Filed May 29, 1968, Ser. No. 732,868
Int. Cl. C10j *3/84;* C10k *1/00, 1/08*
U.S. Cl. 48—196    15 Claims

ABSTRACT OF THE DISCLOSURE

Continuous process for the recovery of essentially all the particulate carbon from a stream of raw synthesis gas made by the partial oxidation of a feedstock comprising a mixture of hydrocarbon oil and a concentrated iron hydroxide flocced carbon-water slurry at an autogenous temperature within the range of 1800–3000° F. and a pressure within the range of about 100–3000 p.s.i.g., wherein the formic acid produced in the reaction zone and in the gas quench and scrubbing zone is reacted with iron from the iron hydroxide floc to form a water-soluble iron formate floccing agent which dissolves in the acidic water in the quench and scrubbing zone and contacts the particulate carbon in the carbon-water dispersion formed therein when the effluent gaseous stream from the reaction zone of the generator is quenched and scrubbed with said water; and then by the addition of ammonia the iron formate is converted to gelatinous iron hydroxide which flocs the carbon and forms a flocced carbon-water slurry which is concentrated by filtration or sedimentation, and the excess water is returned to the quench and scrubbing zone while the concentrated flocced carbon-water slurry is mixed with a hydrocarbon liquid to constitute the aforesaid feedstock.

BACKGROUND OF THE INVENTION

Field of the invention

This invention relates to the purification of raw synthesis gas prepared from liquid hydrocarbon fuels. More specifically it relates to a continuous process for the recovery of particulate carbon from the product stream of a synthesis gas generator and utilizing said material as a portion of the feedstock for producing more synthesis gas.

DESCRIPTION OF THE PRIOR ART

Synthesis gas, a mixture of hydrogen and carbon monoxide, is commonly made by the non-catalytic, partial oxidation process, refer to U.S. Pat. 2,582,938, issued to DuBois Eastman. Gaseous mixtures of carbon monoxide and hydrogen may be also produced by the catalytic stream reformation of a hydrocarbon and by the water-gas reaction which involves reacting coal with air and steam.

In each of these processes, the effluent stream of raw synthesis gas from the reaction zone may contain a small amount of carbon dioxide, water vapor, and from about 0.5 to 5 wt. percent of unburned particulate carbon (basis C in feedstock). If subsequent steps in the process involve reacting the raw synthesis gas over a catalyst, i.e., water-gas catalytic shift conversion to produce additional $H_2$ and $CO_2$ by the reaction of CO and $H_2O$ over an iron-chromium oxide catalyst, removal of the entrained particulate carbon from the raw synthesis gas may be required to prevent deposition on and deactivation of the catalyst.

At present, effluent gas from the gas generators is usually quenched by direct contact with cooling water in a suitable gas-liquid contact apparatus. During quenching, the unconverted particulate carbon and other solid particles entrained in the effluent gas are scrubbed from the product gas with water to form a carbon-water dispersion. It is desirable to maintain the solids content of the dispersion below about 2 percent carbon by weight in order to maintain the suspension sufficiently fluid to facilitate transfer through the pipelines used in the recovery and disposition of the carbon. Generally, about 1 percent solids is preferred for satisfactory pumpability.

An efficient gas quenching and scrubbing apparatus is described in U.S. 2,896,927 issued to R. E. Nagle and DuBois Eastman. Other suitable apparatus for washing the effluent gas include spray towers, bubble plate contactors, and packed columns.

Filtration, evaporation and extraction with light hydrocarbon solvents are typical methods for recovering the particulate carbon suspended in the quench and scrub waters. However, the fine particle size of the carbon makes filtration difficult; and further, the wet voluminous filter cake will not readily burn. Evaporation is ordinarily unsatisfactory due to the considerable amount of heat consumed and the expensive equipment required. Finally, the complex solvent extraction carbon recovery process, which involves solvent handling and solvent losses, may be unattractive for use in some gas production systems.

Carbon particles in the carbon-water dispersion may be recovered therefrom by permitting the dispersion to remain in the quiescent state for a considerable period of time, that is, approximately about 2 or more days, depending on the concentration of the carbon in the slurry. This method of recovering the carbon particles is frequently objectionable because of the need to provide large areas for settling tanks, ponds, etc., the length of time required for settling of the carbon, the high water content in the recovered carbon particle, and in general the relatively inefficient separation of the settled carbon particles from the aqueous liquid. Materials suggested to date to improve separation of the solids from the liquid in the suspension are usually consumed, for example, subsequently in the reaction zone, which adds to the cost of the process.

It is therefore a principal object of the present invention to provide a continuous process for purifying large volumes of raw synthesis gas by which the particulate carbon entrained in the gas stream is economically and efficiently caught in cooling and scrub waters and then easily recovered for use as part of the feedstock for producing more synthesis gas.

Another object of this invention is to utilize an aqueous solution of a metallic salt floccing agent to facilitate the clarification of a water-carbon dispersion and then to economically regenerate the floccing agent for reuse.

A further object of this invention is to provide a simple method for gas purification that integrates the removing of essentially all of the particulate carbon and solid particles from a stream of raw synthesis gas with the simultaneous desulphurizing of the gas stream.

These and other objects will be obvious to those skilled in the art from the following disclosure.

SUMMARY OF THE INVENTION

The subject invention relates to an improved continuous process for recovering essentially all of the particulate carbon from the effluent stream of raw synthesis gas from the reaction zone of a synthesis gas generator. The particulate carbon in the effluent gas stream is removed in the quench and scrubbing zone in acidic water containing a small amount of dissolved iron formate floccing agent, thereby forming a carbon-water dispersion. By the addition of ammonia to the carbon-water dispersion, the floccing agent is precipitated as an iron hydroxide floc in and on the particulate carbon, thereby forming an iron hydroxide flocced carbon-water slurry. Excess water is removed from the slurry by filtration or by sedimentation and is returned to the quench and scrubbing zone. The concentrated flocced carbon-water slurry is then mixed with hydrocarbon liquid and fed into the reaction zone of the generator as feedstock to produce more synthesis gas and to convert the insoluble iron hydroxide floc into the iron formate floccing agent which dissolves in the acidic water in the quench and scrubbing zone. Simultaneously in the generator and in the quench system, gaseous sulfur compounds in the raw synthesis gas react with the iron in the gel to form iron sulfide.

DESCRIPTION OF THE INVENTION

The present invention involves an improved process for recovering particulate carbon from the effluent gaseous stream from a synthesis gas generator and utilizing the carbon as a portion of the feedstock to the generator to produce more synthesis gas. The particulate carbon entrained in the effluent gaseous stream from the reaction zone is removed in water containing a dissolved metallic salt floccing agent e.g. iron formate, thereby forming a carbon-water dispersion. After the aqueous solution of floccing agent completely wets the particulate carbon, the metallic hydroxide floc is then precipitated in place with ammonia. The metallic hydroxide flocced carbon-water slurry which forms as a result of the precipitation is concentrated, mixed with hydrocarbon liquid, and returned to the gas generator to produce more synthesis gas and to convert the metallic hydroxide gel to the metallic salt floccing agent for reuse. Thus the particulate carbon dispersed in the quench and scrub waters is recovered by converting the dissolved metallic salt floccing agent into an insoluble metallic hydroxide gel which flocs the carbon. There is very little net loss of metallic salt floccing agent as it is reconverted in the gas generator from the metallic hydroxide gel. Further the net loss of carbon is very little as the carbon recovered by our process is fed back to the generator as a portion of the fuel to produce more synthesis gas.

In accordance with the process of my invention the feedstock to a flow-type synthesis gas generator may comprise a mixture of a hydrocarbon liquid and an iron hydroxide flocced carbon-water slurry to be further described. The feedstock is usually preheated to a temperature in the range of 500 to 800° F., generally to a temperature of at least 600° F. so that the hydrocarbon oil may be partly or completely vaporized and mixed with or dispersed, along with the particulate carbon, in vaporized water supplied by the slurry. This, all or part of the steam requirements in the reaction zone may be obtained from the water supplied with the iron hydroxide flocced carbon-water slurry, which is a significant cost savings. The feedstock is reacted with an oxygen-rich gas stream containing, for example, in excess of 95 percent oxygen by volume (available from a commercial source) in a refractory lined reaction zone at an autogenous temperature with in the range of about 1800 to 3200° F., preferably in the range of about 2200 to 2800° F. One economic advantage of preheating the feedstock is that this permits a substantial reduction in free oxygen consumption during burning. Oxygen may be preheated, but this is not essential to successful operation of the process. The reaction zone is usually maintained at a pressure above about 100 pounds per square inch, e.g. 600 to 3000 p.s.i.g.

The ratio of atoms of oxygen to atoms of carbon, O/C, is in the range of about .9 to 1.2 and the water/fuel ratio is in the range of about 0.2 to 1.0 lb./lb.

In one embodiment of the invention, the reactants are introduced axially into the upper end of the closed compact cylindrical-shaped reaction zone of a generator in the absence of catalyst or packing. For example, a stream comprising the dispersion of vaporized hydrocarbon, steam, gel, and particulate carbon and a separate stream of oxygen are separately introduced into the reaction zone by means of a burner and mixed therein so as to maintain the locus of combustion removed from the point of introduction of the reactants. By impingement of the streams on one another at relatively high velocity, e.g. from about 60 to about 300 feet per second, intimate mixing is accomplished. Details of burner structures suitable for use in this process are shown in U.S. Pats. Nos. 2,928,459, and 2,928,460, Eastman et al., issued Mar. 15, 1960.

The effluent stream of raw synthesis gas from the reaction zone consists primarily of substantially equimolar quantities of carbon monoxide and hydrogen and contains relatively small amounts of $CO_2$, $H_2O$, $CH_4$, HCOOH, $N_2$, A, and particulate carbon. The particles of carbon are porous and have an unusually large surface area.

Electron micrographs shows the carbon particles to resemble hollow spheres or "sponge like" structures about 70 millimicrons in diameter. Due to this structure the carbon has a high surface area, about 600 to 800 square meters per gram or 25 acres per pound. The carbon varies in surface area depending on generator operating conditions. High surface area also limits the loading of carbon in slurries with water or fuel oil of low concentrations of carbon. Particulate carbon is both oleophilic and hydrophilic and 1 gram of particulate carbon will absorb about 1 to 4 cc. of oil or water. The hydrophilic nature of the particulate carbon aids the dilute aqueous solution of metallic salt floccing agent to wet the surface of the carbon particles and to pass freely into the pores.

The temperature of the hot gaseous effluent discharged axially from the lower end of the reaction zone of the synthesis gas generator is reduced within seconds to about 450–650° F. and the entrained particulate carbon is substantially removed by passing the hot gases through a dip-leg which discharges below the water level in the cylindrical quench chamber of the generator located immediately below the reaction chamber. This, the dip-leg is actually a large diameter pipe connecting the reaction and quench zones. A draft tube surrounding the dip-leg creates an annulus through which the mixture of gas and water rises and splashes against a support plate under the reaction chamber. The water and gas then separate in the upper part of the quench chamber in the space outside of the draft tube. Fresh water at a pH in the range of about 4.5 to 7 is normally introduced through the quench ring at the top of the dip-leg to cool the exposed metal at that point. Large quantities of steam are generated and the quench chamber may be likened to a high output, high pressure boiler. The movement of large volumes of effluent gas through the water in the quench chamber at high velocity creates a turbulence which helps to scrub the particulate carbon from the effluent gas. The circulation of water in the quench chamber maintains the entire quench and gas scrubbing system at essentially the temperature corresponding to the partial pressure of the steam in the quench chamber.

Depending on the specific operating conditions, up to about 1 wt. percent of the carbon in the charge stock to the gas generator is converted into formic acid in the reaction and quench chambers, making the quench water acidic. The reaction is principally between carbon monoxide and steam, as shown in Equation I, and secondarily by the reaction between hydrogen and carbon dioxide, as shown in Equation II.

$$H_2O + CO = HCOOH \qquad (I)$$

$$H_2 + CO_2 = HCOOH \qquad (II)$$

Less than 1% of the formic acid dimerizes as shown in Equation III.

$$2HCOOH \text{ (monomer)} = 1(HCOOH\text{---}HCOOH)$$
$$\text{dimer} + 14.3 \text{ cal.} \qquad (III)$$

Ionization of the formic acid takes place in the quench water as shown by Equation IV.

$$HCOOH = HCOO^- + H^+$$

It is advantageous to run the quench and scrubbing zone at the same high pressure as the pressure in the reaction zone. It was unexpectedly found that by operating a partial oxidation synthesis gas generator at high pressure, i.e. 600 to 3000 p.s.i.g. with hydrocarbon liquid fuels, the quantity of HCOOH produced in the reaction zone and the quench and scrubbing zone may be correlated with the total generator pressure. Greater amounts of HCOOH for making iron formate are thereby produced at high pressures. The more soluble iron in the quench and scrubbing waters the more floc is produced for coagulating the suspended solids. Also, by operating the gas generator at high pressures, carbon recovery is facilitated and relatively high temperatures may be reached in the scrubbing zone. Further, the cleaned product gas can be supplied to subsequent process steps at substantially generator pressure; for example, in the synthesis of amomnia from the hydrogen and nitrogen at high pressure and with a high content of water vapor, little or no further compression is necessary.

The water in the quench and gas scrubbing zone is recycled for economic reasons, as will be further described. If no pH control is exercised, the concentration of formic acid in the recycled quench water system would build up and the pH would fall. At a pH in the range of about 2–4, corrosion of carbon-steel piping and tanks in the system may take place. However, this is prevented and pH control is facilitated by the process of my invention which maintains a pH of the quench and scrubbing zone in the range of about 4.5 to 7. The iron hydroxide supplied as a portion of the charge stock is reduced in the reaction zone of the generator and the products of the reaction are combined with some of the formic acid in the reaction and quench zones to produce the iron formate floccing agent which dissolves in the quench water. The dilute aqueous iron formate solution which is formed then flows into the pores and coats the surfaces of the suspended particulate carbon. About 100 to 1000 parts per million of soluble iron in the quench and scrubbing waters will allow the system to operate in the desired manner.

Cleaned synthesis gas is withdrawn from the top of the quench chamber and may be used without further processing as the charge stock for chemical synthesis. Or, the gas may be submitted to further washing and processing, depending upon the desired end use.

The particulate carbon scrubbed from the raw synthesis gas in the quench and scrubbing zone forms a carbon-water dispersion. To recover the carbon, the dispersion is then pumped into a settling tank. However, along the way a sufficient amount of ammonia is injected into the dispersion to precipitate gelatinous iron hydroxide floc in the pores and on the particulate carbon, thereby forming an iron hydroxide flocced carbon-water slurry. In the settling tank, excess water accumulates in the upper part of the tank in a layer over the flocced carbon-water slurry that falls to the bottom of the tank. Alternately, the excess water may be separated from the flocced carbon-water slurry in a separating zone by filtration or by centrifuge. The excess water removed from the separating zone, for example from the top of the settling tank is maintained at a pH of 7 or below if the water is used directly to scrub out particulate carbon from the effluent gas. This may be done by mixing the excess water with water made acedic from the HCOOH produced in the gas generator; e.g. in the quench zone. Or, if desired in some cases, supplemental additions of formic or acetic acid may be made to the excess water, for example at the quench ring.

It is much easier to separate excess water from the iron hydroxide flocced carbon-water slurry than from the carbon-water dispersion. Furthermore, more carbon can be held in the flocced slurry, as compared with the maximum amount of carbon in a carbon-water dispersion, and still be pumpable. It is economic to recycle the excess water separated from the flocced slurry back to the quench zone to scrub particulate carbon from more raw synthesis gas. To avoid pumping difficulties, it is recommended that the wt. percent of carbon in the concentrated flocced slurry from the bottom of the settling tank should not exceed 4 to 5%. A dispersant, such as sodium lignosulfonate sold under the trade name "Marasperse," may be added to the concentrated slurry if desired, to improve its pumping characteristics.

Depending upon the amount of sulfur present in the hydrocarbon liquid feed, the concentrated iron hydroxide flocced carbon-water slurry will contain a small percentage of iron sulfide. This is formed in the reaction and quench zones by the iron reacting with the gaseous sulfur compounds. Also, the slurry will contain some ammonium formate which is formed when the iron formate is converted into the iron hydroxide. The remainder of the concentrated flocced carbon-water slurry will constitute from about 92 to 97 wt. percent of water and from about 0.1 to 1.6 wt. percent of iron hydroxide. The concentrated slurry is removed from the separating zone and mixed with a hydrocarbon liquid at a wt. ratio in the range of about 1 part slurry to 1 to 5 parts hydrocarbon liquid. After being preheated to a temperature of about 600° F., as previously described, this mixture is charged to the reaction zone of the gas generator and the process is repeated.

Should it be necessary to reduce the entrained solids content of the raw synthesis gas to well below 5 parts per million, then the scrubbing zone will include gas washing steps in addition to the scrubbing that the gas gets in the quench chamber. For example, the washed stream of synthesis gas may be removed from the top of the quench chamber and sent through a turbulent scrubbing zone, preferably in the form of a venturi mixer which may be in the form of a nozzle or plate orifice. Here, the gas stream is accelerated and a portion of the excess water from the flocced slurry separating zone is injected into the accelerated gas stream, for example, at the throat of the venturi or orifice. Water rates, expressed in gallons of water per thousand standard cubic feet of dry gas, range from about 5 to 15, preferably 10. The resulting mixture of gas and dilute dispersion of particulate carbon in water is directed through a dip tube into a pool of water located at the bottom of a separating tower, wherein separation is effected between cooled, clean product gas and the water containing dispersed particulate carbon. The separating tower is suitably a vertical, cylindrical-shaped vessel in which the raw synthesis gas rises and is discharged from the upper end as a clean product gas. The dilute dispersion of particulate carbon in water that is withdrawn from the bottom of the sepaarting zone may be recycled to the quench zone of the generator.

The process of my invention is particularly suitable for the partial oxidation process, although it is adaptable to removing substantially all of the entrained carbon and solids from the effluent gaseous stream produced by many other hydrocarbon gasification processes well known in the art. The partial oxidation process for making synthesis gas as employed in my process is economically attractive and offers a wide choice of feedstocks including natural gas, propane, butane, lignite, bituminous and anthracite coals, naphtha, gas oil, reduced crude, whole crude, coal tar oil, shale oil and tar sand oil. Further, low cost hydrocarbon oils having an API gravity less than 12° API are especially suitable. For example, heavy fuel oils which may be used in the process include heavy distillates, residual fuel oil, bunker fuel oil, No. 6 fuel oil, and fluid residua from various petroleum distillation and cracking process operations, and the like.

In addition to iron formate, other metallic formate salts e.g. formates of aluminum and magnesium, may be used as floccing agents in the process of my invention providing they perform as follows. Such formate salts should be very soluble in water at a tempertaure in the range of about 450 to 650° F. By the addition of ammonia or some other suitable alkalis to such metallic formate salt solutions, an insoluble gelatinous metallic hydroxide should precipitate. Furthermore, such metallic hydroxide derivatives should be capable of being reduced in the gas generator by the gases produced therein; and then the products of the reduction should be capable of reacting with the formic acid in the reaction zone and in the quench and scrubbing zone to reform the water soluble metallic formate salt.

In a second embodiment of the invention the hot effluent gaseous stream from the reaction zone of a high pressure synthesis gas generator is passed directly into a waste heat boiler and cooled to a temperature in the range of about 450 to 800° F. by indirect heat exchange. The charge stock to the reaction zone and the effluent gaseous stream have the same composition as in the first embodiment. Free carbon particles are separated from the cooled effluent gaseous stream leaving the waste heat boiler by sending the gas through a scrubbing zone which discharges into a separating tower of the type previously described. Cleaned product gas is taken from the top of the separating tower.

Carbon-water dispersion containing the iron formate floccing agent is withdrawn from the bottom of the separating tower and injected with sufficient ammonia to precipitate the iron hydroxide gel and to floc the carbon, thereby forming the iron hydroxide flocced carbon-water slurry which is sent to a separating zone where excess water is removed. As described in the first embodiment, the separation of the flocced slurry in the separating zone may be accomplished by either sedimentation in a settling tank, filtration, or by centrifuge. The excess water at a pH of 7 or below is recycled to the turbulent mixing zone, for example, at the throat of the venturi or mixing orifice. A feedstock mixture of hydrocarbon liquid and concentrated flocced carbon-water slurry removed from the separating zone may be preheated and charged into the reaction zone of the generator, as previously described in the first embodiment.

DESCRIPTION OF THE PREFERRED EMBODIMENT

The process of the invention is further illustrated but is not to be limited by the following examples.

A feedstock mixture comprising 593.6 lbs./hr. of heavy fuel oil containing 1.77 wt. percent S and 0.78 wt. percent of N and having a gravity of 13.8° API and a Saybolt Furol viscosity of 155 seconds at 122° F., together with 289.6 lbs./hr. of iron hydroxide flocced carbon-water slurry having the following composition on a wt. percent basis: particulate carbon 4.00, $H_2O$ 94.95, $Fe(OH)_2$ 0.9, FeS 0.1, and $NH_4COOH$ 0.05, is reacted in a conventional flow-type synthesis gas generator comprising a reaction and a quench zone as shown in U.S. Pat. 3,147,093 to R. M. Dille et al. with 8,156 s.c.f.h. of 99.5 mole percent oxygen that is introduced at a temperature of 273° F. The reaction zone is maintained at an average autogenous temperature of 2,595° F. and an average pressure of 1,255 p.s.i.g. 30,002 s.c.f.h. (dry) of a hot gaseous effluent stream is produced containing 0.16 wt. percent of unreacted particulate carbon (basis C in hydrocarbon feed), and having the following composition (wt. percent, dry): CO, 46.59; $H_2$, 45.68; $CO_2$, 6.72; $CH_4$, 0.60; and small amounts of COS, $H_2S$, A, $N_2$ and HCOOH.

The hot effluent gaseous stream is withdrawn from the reaction zone of the gas generator and is cooled to a temperature of 491° F. by direct immersion in acidic water in the quench chamber. The quenched partially cleaned and cooled gaseous product stream is withdrawn from the top of the quench zone and washed further with 739 lbs./hr. of water at a temperature of 485° F. in a tubulent scrubbing zone comprising a mixing orifice or venturi mixer which discharges a mixture of washed product gas and a dilute carbon-water dispersion into the bottom of a separating tower operating at a pressure of 1,255 p.s.i.g. Cleaned product gas is withdrawn from the top of the separating tower for use as feedstock in a separate chemical synthesis process. The concentration of solid particles in the cleaned product gas is about 5 parts per million. The dilute dispersion of particulate carbon in water is withdrawn from the bottom of the separating tower and introduced at a pH of 7 or lower into the quench chamber.

4.4 lbs./hr. of HCOOH is produced in the reaction and quench zones of the generator by the reaction between CO and $H_2O$. In the reaction and quench zones about 1.5 lbs./hr. of HCOOH reacts with $NH_3$ and 2.7 lbs./hr. of HCOOH reacts with iron to produce 4.3 lbs./hr. of iron formate which dissolves in the quench water. The pH of the quench water is maintained at 4.5 by excess formic acid produced in the reaction and quench zones. Particulate carbon in the carbon-water dispersion in the quench chamber will absorb dilute aqueous iron formate solution in the amount of 3.00 cc. of iron formate solution per gram of carbon. Besides being absorbed into the pores of the carbon, the iron formate floccing agent will wet the surface of the carbon and any other solid particles dispersed in the quench water.

The carbon-water dispersion is withdrawn from the bottom of the quench chamber and injected with 1.0 lbs./hr. of ammonia or some other alkali suitable to precipitate gelatinous iron hydroxide floc in the dispersion and form the iron hydroxide flocced carbon-water slurry. The flocced slurry is introduced into a settling tank where, by gravity separation, the iron hydroxide flocced carbon-water slurry is concentrated at the bottom of the tank while excess clear water accumulates above. Retention periods range from 1 to 3 hours. The concentrated iron hydroxide carbon-water slurry is withdrawn from the bottom of the settling tank and mixed with heavy fuel oil to constitute the feedstock mixture for the generator, as described previously. 6,867 lbs./hr. of excess water is withdrawn from the top of the settling tank, and at a pH of 7 or less. 739 lbs./hr. is introduced into the previously described turbulent scrubbing zone and 6,128 lbs./hr. is recycled to the quench zone.

The process of the invention has been described generally and by examples with reference to feedstocks, effluent gas streams, metallic salt floccing agents, metallic hydroxide gels, and various other materials of particular composition for purposes of charity and illustration only. From the foregoing it will be apparent to those skilled in the art that various modifications of the process and the materials disclosed herein can be made without departure from the spirit of the invention.

I claim:

1. A process for recovering unconverted particulate carbon present in the hot gaseous effluent stream from the reaction zone of a synthesis gas generator comprising:
   (1) contacting said effluent gas stream with water containing a dissolved metallic formate floccing agent to produce a dispersion of particulate carbon in water and a stream of washed product gas;
   (2) injecting sufficient alkali into the carbon-water dispersion of (1) to precipitate a gelatinous metallic hydroxide in and on said particulate carbon, producing a flocced carbon-water slurry;
   (3) separating excess water from the flocced carbon-water slurry of (2) in a separating zone and recovering a concentrated flocced carbon-water slurry.

2. The process of claim 1 wherein the contacting water in (1) is maintained at a pH in the range of 4.5 to 6.5 by the absorption of HCOOH produced in the reaction zone of the generator.

3. The process of claim 1 wherein the excess water of (3) is adjusted to a pH of less than 7 by the addition at least in part of a supplementary quantity of acid from an external source, before said excess water is recycled to the contacting zone of (1).

4. The process of claim 1 wherein the metallic formate floccing agent in (1) is iron formate.

5. The process of claim 1 wherein the flocced carbon-water slurry of (2) is separated from the excess water in (3) by sedimentation of the slurry in a settling tank.

6. The process of claim 1 wherein the excess water in (3) is separated from the flocced carbon-water slurry of (2) by filtration.

7. The process of claim 1 wherein the metallic formate floccing agent in (1) is aluminum formate.

8. A process according to claim 1 wherein said washed product gas stream in (1) is further contacted with water in a turbulent mixing zone, thereby reducing the content of solid particles in said gas stream to less than about 5 parts per million.

9. The process of claim 1 in which said effluent gas stream is cooled by indirect heat exchange prior to said contacting.

10. A process for producing a stream of synthesis gas which is substantially free of particulate carbon which process comprises:
 (1) subjecting a feedstock comprising a mixture of a carbonaceous fuel and a concentrated iron hydroxide flocced carbon-water slurry to partial oxidation in the reaction zone of a synthesis gas generator at an autogenous temperature within the range of about 1800 to 3000° F. and at a pressure in the range of about 100 to 3000 p.si.g. to produce a hot effluent gaseous stream comprising $H_2$ and CO, and containing minor amounts of $CO_2$, HCOOH, $H_2O$, particulate carbon, iron and iron formate;
 (2) cooling and washing the effluent gaseous stream from (1) in a gas scrubbing zone by direct contact with water containing dissolved iron formate floccing agent, forming a dispersion of particulate carbon in water containing dissolved iron formate floccing agent, and removing from said quench and scrubbing zone a product stream of synthesis gas substantially free from particulate carbon;
 (3) injecting sufficient ammonia into the carbon-water dispersion of (2) to precipitate a water insoluble gelatinous iron hydroxide floc in and on said particulate carbon, forming an iron hydroxide flocced carbon-water slurry;
 (4) separating excess water from the flocced carbon-water slurry of (3) in a separating zone, forming a concentrated slurry; and
 (5) recycling the concentrated iron hydroxide flocced carbon-water slurry of (4) to the synthesis gas generator of (1) as a portion of said feedstock.

11. The process of claim 10 wherein the hot effluent gaseous stream of (1) is cooled by indirect heat exchange in a waste heat boiler and then introduced into the gas scrubbing zone of (2) where the gas is contacted with a portion of the excess water from (4) in a venturi turbulent mixing zone to form a mixture of carbon-water dispersion and product gas which are separated from each other in a separating zone.

12. The process of claim 10 wherein the carbonaceous fuel in (1) is a hydrocarbon liquid containing sulfur, and substantially all of the sulfur is converted in the reaction zone to FeS.

13. The process of claim 10 wherein the iron hydroxide flocced carbon-water slurry is concentrated in (4) by means of filtration.

14. The process of claim 10 wherein the iron hydroxide flocced carbon-water slurry is concentrated in (4) by gravity separation.

15. The process of claim 10 wherein about 100–1000 p.p.m. of iron is dissolved in the water in the scrubbing zone of (2).

References Cited

UNITED STATES PATENTS

| | | | |
|---|---|---|---|
| 2,980,521 | 4/1961 | Dille et al. | 48—196 |
| 2,980,522 | 4/1961 | Dille et al. | 48—196 |
| 2,982,635 | 5/1961 | Dille | 48—196 |
| 3,349,029 | 10/1967 | Cheng | 48—212 |
| 3,473,903 | 10/1969 | Paull et al. | 48—196 X |

MORRIS O. WOLK, Primary Examiner

R. E. SERWIN, Assistant Examiner

U.S. Cl. X.R.

23—209.6; 48—212, 215; 55—22; 210—43